United States Patent
Von Brimer

[15] 3,646,354
[45] Feb. 29, 1972

[54] ELECTRICAL SUPERVISORY CONTROL

[72] Inventor: Joe W. Von Brimer, Apt. 2, 3664 Vegas Plaza Drive, Las Vegas, Nev. 89103

[22] Filed: Nov. 5, 1970

[21] Appl. No.: 87,190

[52] U.S. Cl. ............................307/10 BP, 320/40, 317/31, 307/94
[51] Int. Cl. .........................................H02g 3/00
[58] Field of Search ..............320/39, 40; 317/31 X; 307/94, 307/9, 10 R, 10 BP

[56] References Cited

UNITED STATES PATENTS

| | | | |
|---|---|---|---|
| 3,474,296 | 10/1969 | Rickey | 320/40 X |
| 3,522,481 | 8/1970 | Terzic | 320/40 X |
| 3,395,288 | 7/1968 | Von Brimer | 307/10 |

Primary Examiner—Herman J. Hohauser
Attorney—Robert C. Smith

[57] ABSTRACT

A control circuit is connected into the electrical system of a vehicle such as an automobile having a starting motor, a battery, and various current-consuming load devices, such as headlights. A relay-operated switch is connected between the battery and the load devices. A potentiometer is connected across the battery, and the relay winding and a transistor are connected across the potentiometer with the potentiometer slider connected to the base of the transistor and the collector connected to the relay winding. The resistance values are chosen such that when the battery is substantially charged, the voltage across the base-emitter junction of the transistor is sufficient to keep the transistor conducting, thus causing the relay to be energized and the switch to be closed, connecting the load devices to the battery. Should the battery be run down, as through leaving the headlights on, the battery voltage will drop, and at some desired proportion of full charge the voltage across the base-emitter junction will become too low to keep the transistor conducting, and the relay will drop out, opening the switch and disconnecting the load devices. A reset switch is provided to reconnect the remaining battery voltage across the relay winding.

8 Claims, 3 Drawing Figures

PATENTED FEB 29 1972 3,646,354

INVENTOR.
JOE W. VON BRIMER

BY Robert C. Smith
ATTORNEY

ELECTRICAL SUPERVISORY CONTROL

BACKGROUND OF THE INVENTION

It is not uncommon for the operator of a vehicle to park his vehicle and leave it for some considerable period of time and to find, upon returning, that he has left his headlights on or that, because of the existence of a short circuit in the electrical system, that battery has been depleted to the point where it will no longer start the engine. One means which has been devised to meet this problem is the "Battery Guard System" described in U.S. Pat. No. 3,395,288, patented in the name of J. W. Von Brimer. In that system a voltage-sensitive relay is provided which is capable of sensing the voltage drop across the battery, and when the battery is depleted to some given percentage of a full charge, the relay will drop out, thereby disconnecting the headlights and most of the other energy-consuming systems in the vehicle, as well as the starter motor. By means of a reset button, the operator may then reconnect the battery to the starter so that the engine may be started with the partially depleted battery. As soon as the vehicle engine is in operation the generator or alternator will normally raise the voltage to a sufficient level to keep the voltage-sensitive relay closed. Although the system described in the above patent is satisfactory from a standpoint of operation, it has proven to be somewhat more expensive than the market will readily accept in high volume. In particular, the voltage-sensitive relay itself has added substantially to the cost of producing the system.

DETAILED DESCRIPTION OF THE DISCLOSURE

Figure 1:
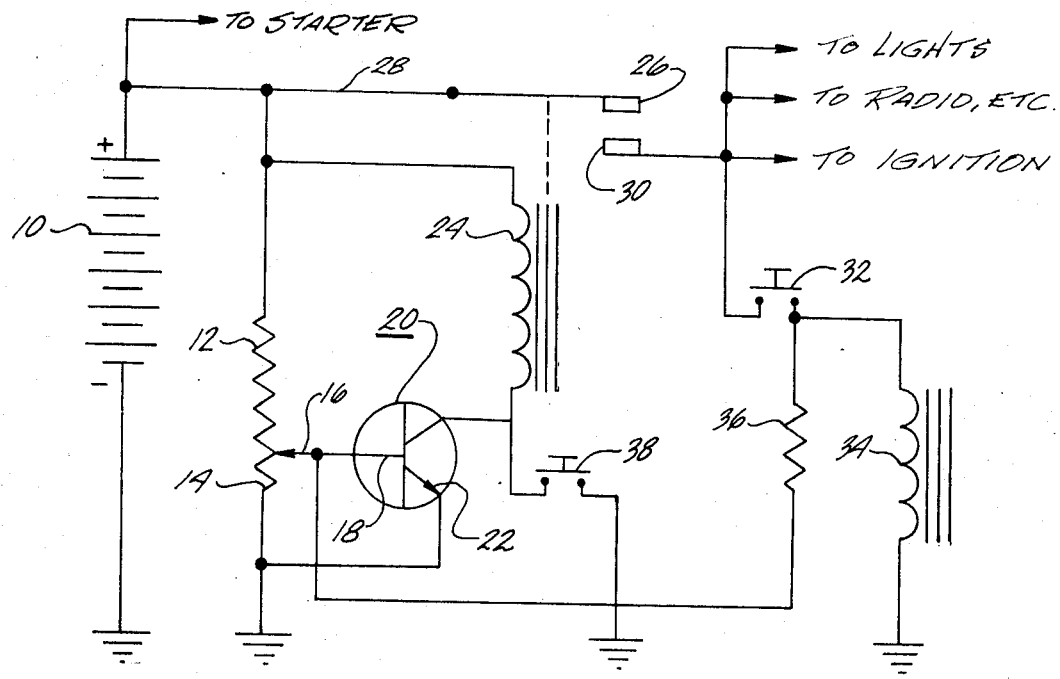
FIG. 1 is a schematic diagram of a supervisory control incorporating my invention.

Referring now to FIG. 1, a conventional automobile battery 10 is shown with its negative terminal connected to ground and its positive terminal connected to a starter switch and to one end of a voltage divider, which is shown consisting of two separate resistance elements 12 and 14 forming part of a potentiometer having a slider 16. Resistors 12 and 14 could also be two separate fixed resistors. The slider 16 of the potentiometer is connected to the base terminal 18 of a transistor 20. The emitter 22 of transistor 20 is connected to ground, and thus a fixed proportion of the battery voltage is impressed across the base-emitter junction of transistor 20. The values of these resistors may be adjusted to a condition where the impressed voltage across the base-emitter junction of transistor 20 is at a desired value either above or below the breakdown level of the junction.

It is a known characteristic of transistors that the base-emitter junction will not conduct current until a specific voltage level, typically about two-thirds volt, is reached, and above such voltage level the resistance of the base-emitter junction is comparatively low, and the junction will conduct. By adjusting the values of resistances 12 and 14, this breakdown level may be made to correspond to a battery voltage output representing a particular percentage of depletion of the battery 10.

Figure 2:
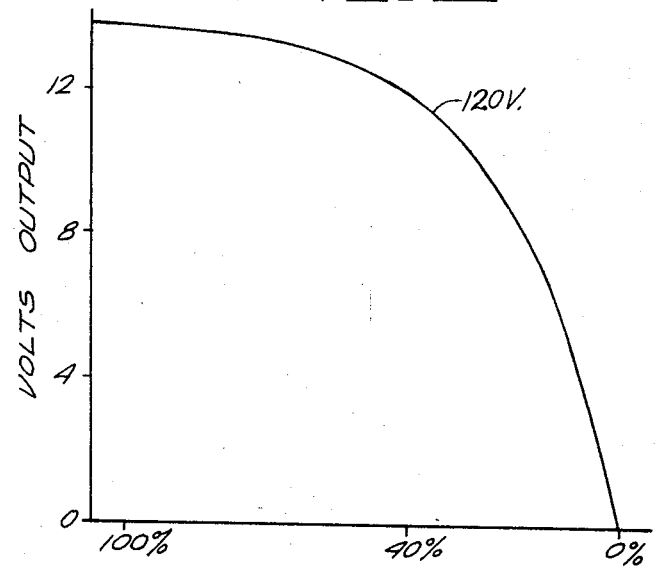
FIG. 2 is a graph showing the manner in which the battery voltage output varies with its percentage of charge.

A graph showing a battery charge versus voltage output characteristic for a typical 12-volt battery is shown in FIG. 2. When the battery is 100 percent charged, the output voltage may measure as high as 13.8 volts. When the battery has been depleted such that it is 60 percent discharged or has only 40 percent of its remaining charge, the voltage will then drop to a lower value, typically 12.0 volts. A further reduction in the charge of the battery causes its output voltage to drop rapidly below 12 volts.

Connected between the collector circuit of transistor 20 and the positive side of battery 10 is a winding of a relay 24 which has an armature driving a movable contact 26 connected through a conductor 28 to the positive side of battery 10 and which cooperates with a stationary contact 30 to supply battery current to the engine ignition circuit as well as to various load circuits such as the radio, lights, etc. Also connected to contact 30 is a starter solenoid switch 32 which, when closed, energizes the starter solenoid 34.

Connected to the collector circuit of transistor 20 is a reset switch 38 which connects the relay 24 directly to ground when the switch is closed. The relay 24 can be made to open at almost any desired level above its normal "dropout" voltage. The closing level of the relay 24 is a voltage higher than the "dropout" voltage, but the voltage differential between the opening and closing is normally small. Relay 24 would need to be relatively expensive if it were necessary to operate within this range alone.

It will be recognized that the circuit involving resistors 12 and 14 and transistor 20 can be considered as equivalent to an adjustable voltage regulator with the relay 24 as the load. Since only a very small amount of the current through relay 24 is carried by the base-emitter junction of transistor 20, this arrangement permits the transistor 20 to operate as a voltage regulator in the manner of a zener diode, as well as an amplifier and a switch. This voltage differential may be adjusted by varying the values of resistors 12 and 14 without changing the dropout level so long as a constant ratio of the values of resistances 12 and 14 is maintained, with higher levels of resistance increasing the hysteresis or differential voltage between the closing and dropout voltages of relay 24.

In the circuit of FIG. 1, the supervision function desired is that of disconnecting all or essentially all loads from a vehicle battery system at some voltage level which corresponds to a minimum desired capacity of energy in the battery to insure adequate starter-motor energy. In considering the operation of this device we shall begin with a fully charged battery having an output voltage of 13.8 volts and which, when 60 percent discharged (40 percent of capacity remaining), measures a battery output voltage level of 12.0 volts. Relay 24 might typically have a 1,200-ohm coil, a pull-in voltage of 8.0 volts which corresponds to 6.67 milliamperes current, and a dropout voltage of 4.0 volts or 3.33 ma. The potentiometer 12, 14 may be a 20,000-ohm adjustable resistor with its slider set such that resistance 12 equals 18,889 ohms and resistance 14 equals 1,111 ohms. Transistor 20 may typically have a base-emitter junction breakdown voltage of 0.67 volt, a current gain of 150 with a voltage rating on its emitter-collector of 20 volts or more.

With 13.8 volts across resistors 12 and 14, the voltage at their common tap or slider 16 will be 1,111/20,000×13.8 or 0.765 volt—more than sufficient to cause transistor 20 to conduct. With transistor 20 conducting, the battery voltage will then be impressed across the coil of relay 24 and transistor 20. Relay 24 is energized, and all loads are connected.

When the battery voltage falls to 12.0 volts, the voltage across resistors 12 and 14 equals 1,111/20,000×12 or 0.67 volt, the minimum required to cause conduction of transistor 20. Any further reduction in battery voltage will cause transistor 20 to stop conducting, and the relay will drop out, thereby opening all loads to the battery.

There is an additional characteristic of vehicle electrical systems which must be taken into consideration. Such systems usually will have a temporarily lowered voltage during the heavy starter-motor drain period. This lowered voltage may cause the voltage at the base-emitter junction of transistor 20 to fall below its required 0.666 volt and turn off the system. This undesirable operation during the starting cycle is prevented by means of a circuit including resistor 36 which is connected between the starter solenoid switch 32 and the potentiometer slider 16. The normal 12–14 volts of the battery could conceivably fall to only 6.0 volts during the starter cranking period, although this would be an extreme voltage drop during this operation. The resistor 36 will typically have a value of 5,000 ohms, and during actuation of the starting motor the switch 32 will be at battery potential. The battery voltage of 6.0 volts will then be impressed across a voltage divider consisting of resistors 36 and 14 which produces at their common point, base 18 of transistor 20, a voltage of 1,111/5,000× or 1.33 volts. This, of course, is substantially more than the required 0.67 volt to keep transistor 20 conducting. The 6.0 volts is above the normal dropout voltage of relay 24, and thus the relay will not drop out and disconnect the loads during the starter-motor voltage cycle.

In the event that the headlights have been left on or the battery is for some other reason depleted such that its output voltage falls below 12.0 volts, the relay 24 will open, disconnecting the contacts 26 and 30 as described. As the load is removed from the battery, the voltage will often recover to some degree and will actually increase to above the 12.0-volt level, causing the relay 24 to close the contacts 26 and 30 again. This may occur for several cycles, and in the case of headlights will result in a visual indication of improper operation or malfunction. After a number of such on-off cycles, however, the battery will no longer recover to a voltage sufficient to close the contacts 26 and 30. The nature of this so-called "springback effect" is such that the initial on-off cycles will be rapid and will slowly decrease until the transistor 20 will no longer conduct.

On returning to the vehicle the operator, after determining that the starter will not respond to operation of the switch, needs only to press the reset button 38 which connects the remaining battery voltage directly through the winding of relay 24 to ground, thereby causing the relay to be energized and the contacts 26 and 30 to be engaged. By holding down the reset button 38 and simultaneously closing the switch 32, starting can be accomplished, and since the generator or alternator charging voltage quickly raises the entire system voltage substantially, the transistor 20 will quickly become conductive and the system will operate normally.

Figure 3:
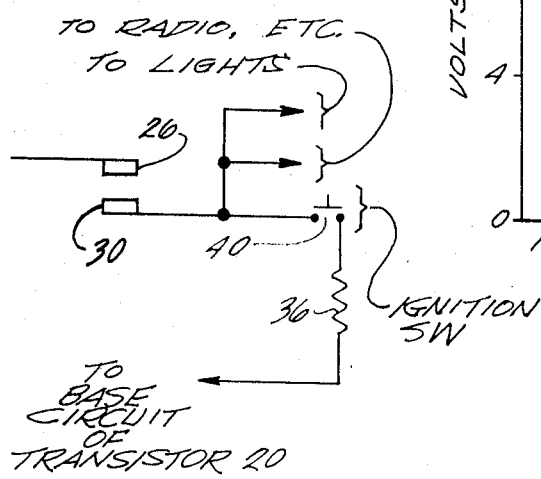
FIG. 3 is a schematic diagram of a modification of the control system of FIG. 1.

FIG. 3 shows a modification of my system which insures that the relay contacts 26 and 30 remain closed while the vehicle is in operation even though the battery voltage drops to a very low value. An unfortunate combination of circumstances could occur in which the battery is being discharged (normally indicated by an anemometer or warning light) even while the vehicle is operating, and it may be dangerous or inconvenient to stop even though the operator is aware that the battery is being depleted through continued operation. In such case one would prefer that the relay not disconnect the electrical system when the battery output drops to 12.0 volts. By connecting resistor 36 to the load side of the ignition switch 40, the relay will not open until the battery voltage has dropped to about 4.5 volts unless the ignition switch is opened. By this time the headlights, if used, would have dimmed to less than 10 percent of normal brightness, and the battery would be quite depleted. In other respects the embodiment of FIG. 3 operates like that of FIG. 1.

I claim:

1. A circuit for monitoring an electrical system including a battery and load means connected to said battery, said circuit comprising:
   switch means connected between said battery and said load means;
   a voltage divider connected across said battery;
   a relay having a winding and an armature connected to said switch means and a transistor, said winding and said transistor being connected in series with each other in parallel with said voltage divider;
   the intermediate terminal of said voltage divider being connected to the base of said transistor such that when said battery is charged to a desired proportion of capacity the base-emitter junction voltage is sufficient to keep said transistor conducting, thereby energizing said winding and closing said switch means, and when said battery is discharged below said desired proportion of capacity, said base-emitter junction voltage drops below the value required to keep this transistor conducting and said winding is deenergized, thus opening said switch means.

2. A circuit for monitoring an electrical system as set forth in claim 1 wherein a reset switch is connected between said winding and the ground side of said battery for impressing battery voltage across said winding to thereby reclose said switch means.

3. A circuit for monitoring an electrical system as set forth in claim 1 wherein additional load means are connected between said switch means and the ground side of said battery and a normally open switch is connected between said switch means and said additional load means.

4. A circuit for monitoring an electrical system as set forth in claim 3 wherein resistance means is connected between the load side of said normally open switch and the base of said transistor, the value of said resistor being such that when said normally open switch is closed, said base-emitter junction is biased to conduction even though said battery voltage may be discharged to below said desired proportion of capacity.

5. A circuit for monitoring an electrical system as set forth in claim 1 wherein said voltage divider comprises a potentiometer having its slider connected to the base of said transistor.

6. A circuit for monitoring an electrical system including a battery and load means connected to said battery, said circuit comprising:
   switch means connected between said battery and said load means;
   a voltage divider connected across said battery;
   a relay and a transistor having emitter base and collector electrodes connected in parallel with said voltage divider, said emitter being connected to the ground side of said battery, said base being connected to the junction point of said voltage divider, said collector being connected to one side of the winding of said relay, and armature means actuated by energizing said winding to open and close said switch means;
   said voltage divider resistance values being such that when said battery is charged to a desired proportion of capacity, the voltage across the base-emitter junction of said transistor is sufficient to keep said transistor in a conducting state, thereby energizing said winding and moving said armature to close said switch means, and when said battery is discharged below said desired proportion of capacity, said base-emitter voltage drops below the value required to keep said transistor conducting and said relay winding is deenergized, thus opening said switch means;
   and normally open reset switch means connected between said winding and the ground side of said battery to energize said winding by impressing battery voltage across said winding resulting in closing said switch means.

7. A circuit for monitoring an electrical system as set forth in claim 6 wherein an additional switch is connected between said switch means and at least a portion of said load, and resistance means is connected between the load side of said switch and the base circuit of said transistor.

8. A circuit for monitoring an electrical system as set forth in claim 6 wherein an electrical motor means is connected between the load side of said switch means and the ground side of said battery, and a normally open switch is connected between said switch means and said electrical motor means.

* * * * *